United States Patent
Bhattacharjee et al.

(10) Patent No.: US 7,519,583 B2
(45) Date of Patent: Apr. 14, 2009

(54) DETECTING AND TRACKING MONOTONICITY FOR ACCELERATING RANGE AND INEQUALITY QUERIES

(75) Inventors: Bishwaranjan Bhattacharjee, Yorktown Heights, NY (US); Timothy Ray Malkemus, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 283 days.

(21) Appl. No.: 11/486,855

(22) Filed: Jul. 14, 2006

(65) Prior Publication Data

US 2008/0016030 A1 Jan. 17, 2008

(51) Int. Cl.
*G06F 17/30* (2006.01)
(52) U.S. Cl. ..................... 707/3; 707/2; 708/3
(58) Field of Classification Search ............ None
See application file for complete search history.

(56) References Cited

U.S. PATENT DOCUMENTS

| | | | |
|---|---|---|---|
| 6,823,329 B2* | 11/2004 | Kirk et al. ............... | 707/2 |
| 6,925,463 B2 | 8/2005 | Bhattacharjee et al. | |
| 6,983,275 B2 | 1/2006 | Koo et al. | |
| 2003/0195881 A1* | 10/2003 | Koo et al. ............... | 707/5 |
| 2003/0195898 A1 | 10/2003 | Agarwal et al. | |
| 2003/0208484 A1* | 11/2003 | Chang et al. ............. | 707/5 |
| 2006/0053123 A1* | 3/2006 | Ide et al. ................. | 707/100 |

* cited by examiner

*Primary Examiner*—Tim T Vo
*Assistant Examiner*—Anh Tai V Tran
(74) *Attorney, Agent, or Firm*—Yee & Associates, P.C.; Lisa M. Yamonaco

(57) ABSTRACT

A computer implemented method, apparatus, and computer usable program code for detecting monotonicity. A determination is made as to whether a function that is assumed to be monotonic will remain monotonic after performing an operation in response to receiving the operation. The operation is allowed to be performed in response to a determination that the function will remain monotonic after performing the operation.

1 Claim, 5 Drawing Sheets

FIG. 4
| NATION | itemID | orderDate <Base Column> | OY = Year(orderdate) <Generated Column> |
|---|---|---|---|
| CANADA | 1 | 01-01-2004 | 2004 |
408 406 404 402 (400)
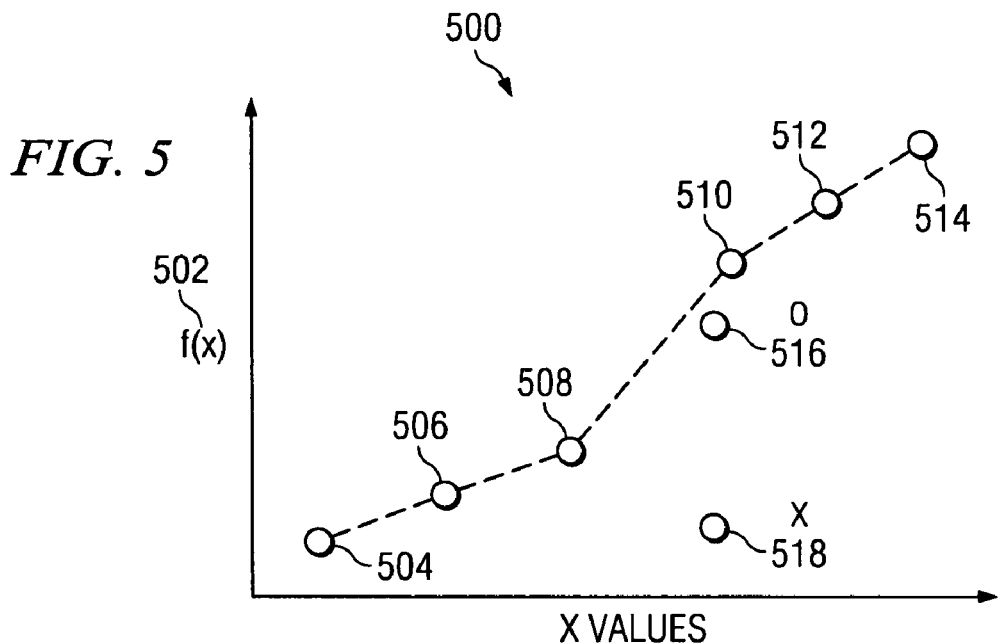
FIG. 5
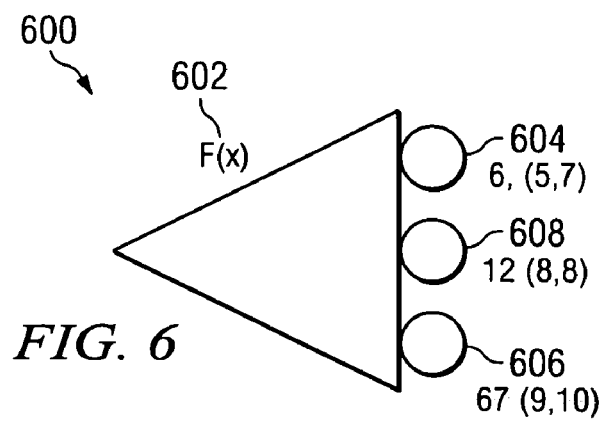
FIG. 6

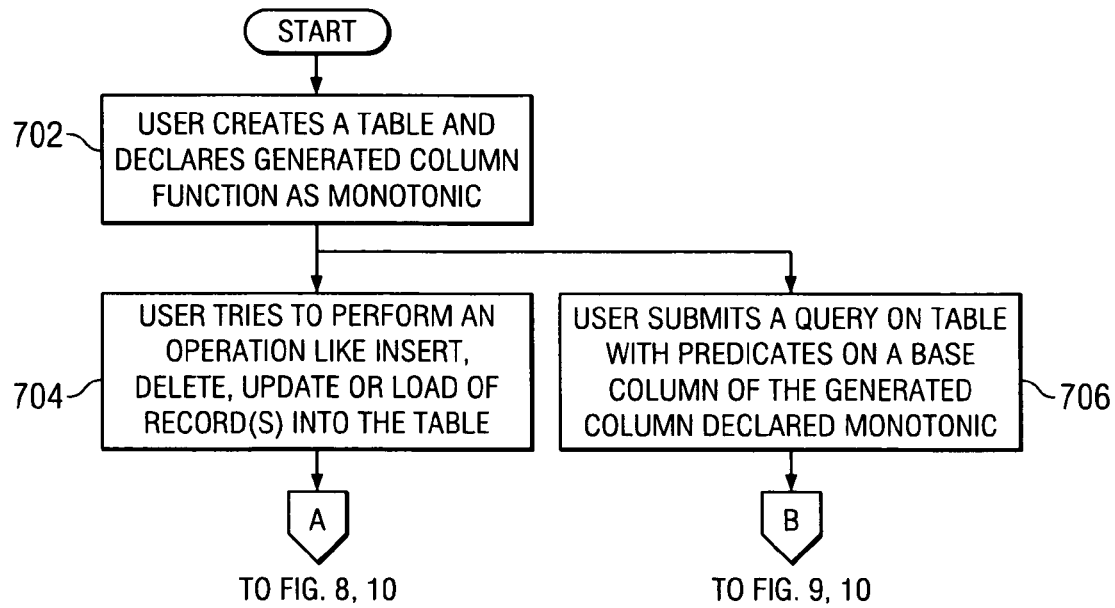
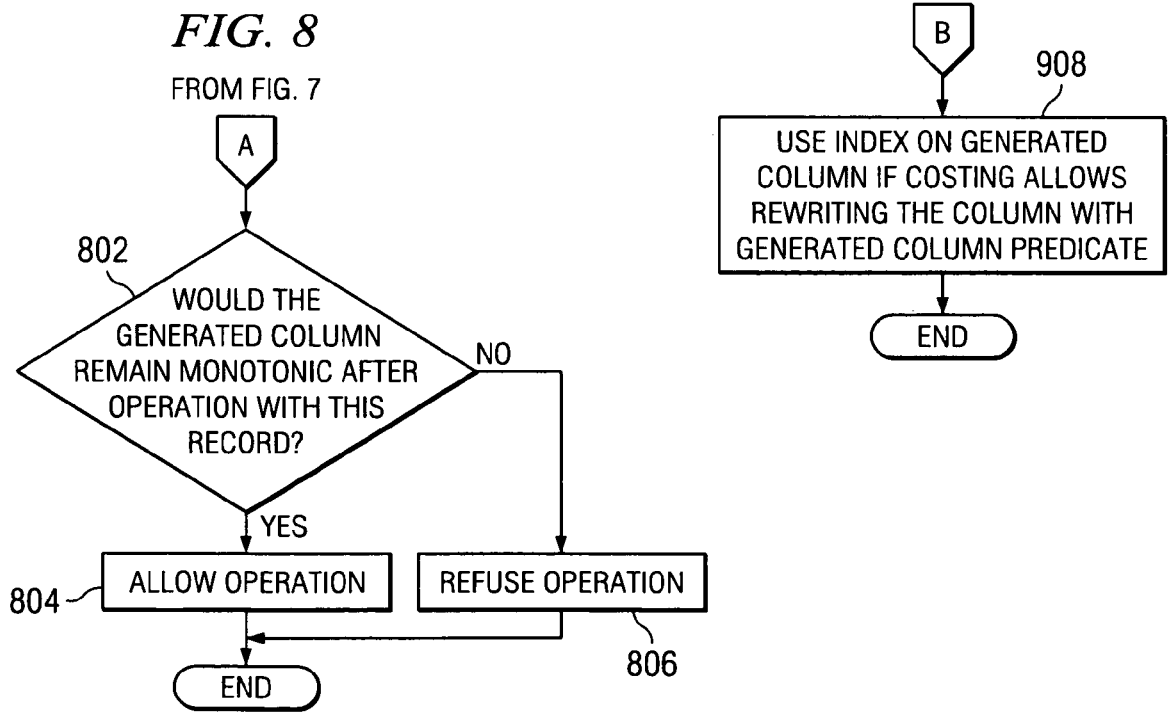

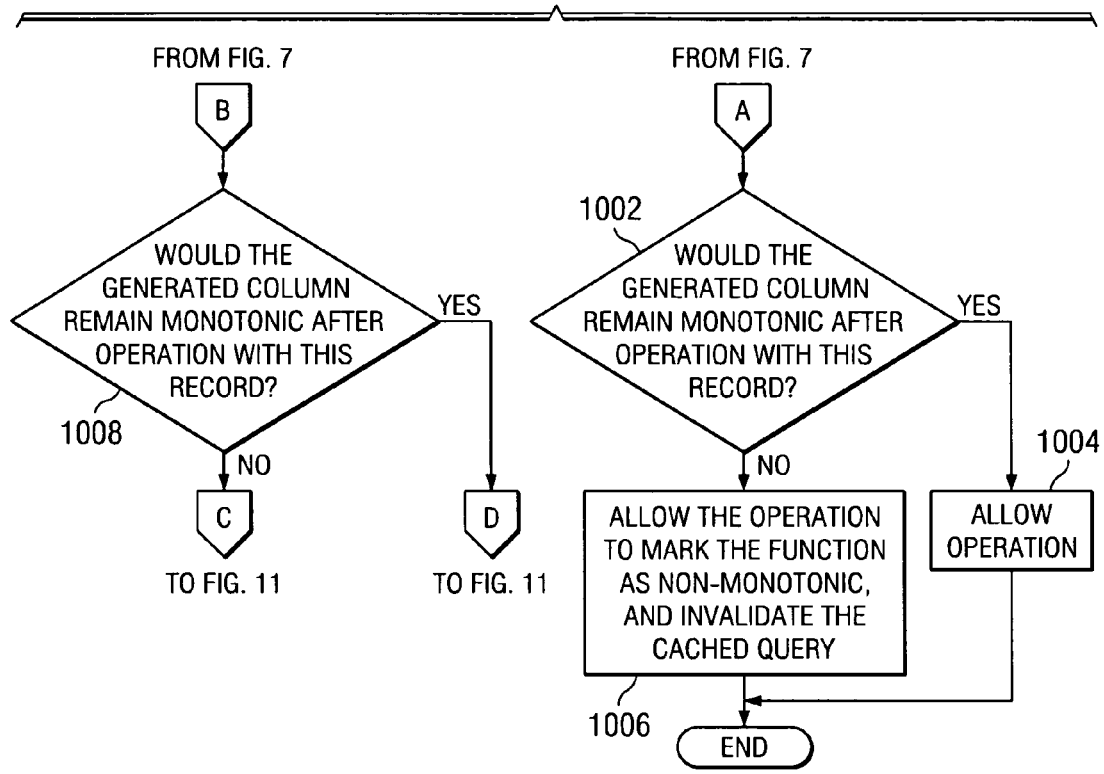

DETECTING AND TRACKING MONOTONICITY FOR ACCELERATING RANGE AND INEQUALITY QUERIES

BACKGROUND OF THE INVENTION

1. Field of the Invention

The present invention relates generally to data processing, and more particularly to a computer implemented method, apparatus, and computer usable program code for detecting and tracking monotonicity for accelerating range queries and inequality queries.

2. Description of the Related Art

Increasing numbers of companies and individuals rely on data retrieval products in order to efficiently access large amounts of data. The data is often stored in a database. In database systems, data is stored in tables. Tables are made up of records, and records are made up of fields or columns. Sometimes two or more columns might be interlinked with one being generated from the other. A column generated from another original or base column is referred to as a generated column.

In database systems, queries are used to retrieve specified data. A query is a request or a specific set of instructions for extracting particular data from a database. Queries are made up of data items or fields to be retrieved and may have limits set on the scope of the data and/or sorting order specified.

To speed up query processing, users and administrators often create indexes. These indexes tend to be on columns in which the queries have predicates or conditions. If the generated column has an index, the index may be used to answer queries which have conditions on the base column. For example, the query may be rewritten to use the generated column. Typically, queries may be rewritten. However, if the query has a range condition or an inequality condition, the query needs to know that the generated column is monotonic before the queries may safely be rewritten. An equality condition for a query predicate is a condition which will result in only one value for that predicate qualifying. For example, the condition "where itemID=10" is an equality condition which will qualify those with itemID=10. A range condition for a query predicate is typically a condition which will result in more than one predicate value for that predicate qualifying. For example, the condition "where itemID between 2 and 4" will result in all values between the boundaries 2 and 4 qualifying. Other examples of range conditions would be "where itemID>2", "where itemID>=2", "where itemID<2" or "where itemID<=2".

Monotonic functions preserve the given order in an increasing or decreasing order. As a result, monotonic functions change in one direction only; thus either strictly rising or strictly falling but not reversing direction. A function F(n) is monotonic if x>y implies F(x)>=F(y) or if x>y then F(x)<=F(y). Examples of monotonic functions include incrementing years. Examples of non-monotonic functions include numeric associates with months January 1, February 2, December 12, and so forth. If the function is not monotonic, then using the index for range or inequality queries could lead to wrong results. Knowing that a function is monotonic is valuable because the function may be used for range and inequalities queries.

The current art on monotonic determination is based on knowledge of identifiable monotonic sub functions being used in the function. If the database system is unable to identify the subfunction as monotonic, the whole function must be flagged as non-monotonic. As a result, the whole function may be monotonic but is flagged as non-monotonic because of the sub-function classification. Thus, the index on the generated column may not be used for conditions with range or inequality queries on the base column, limiting the usage scenarios for the defined index.

SUMMARY OF THE INVENTION

The illustrative embodiments provide a computer implemented method, apparatus, and computer usable program code for detecting monotonicity.

A determination is made as to whether a function that is assumed to be monotonic will remain monotonic after performing an operation in response to receiving the operation. The operation is allowed to be performed in response to a determination that the function will remain monotonic after performing the operation.

BRIEF DESCRIPTION OF THE DRAWINGS

The novel features believed characteristic of the illustrative embodiments are set forth in the appended claims. The illustrative embodiments themselves, however, as well as a preferred mode of use, further objectives, and advantages thereof, will best be understood by reference to the following detailed description of an illustrative embodiment when read in conjunction with the accompanying drawings, wherein:

FIG. 4 is an exemplary table in accordance with the illustrative embodiments;

FIG. 5 is a function graph for monotonic and non-monotonic information in accordance with the illustrative embodiments;

FIG. 6 is a diagram for a data structure in accordance with the illustrative embodiments;

FIG. 7 is a flowchart for user actions in accordance with the illustrative embodiments;

FIG. 8 is a flowchart for a declarative monotonicity process in accordance with the illustrative embodiments;

FIG. 9 is a flowchart for a declarative monotonicity process in accordance with the illustrative embodiments;

FIG. 10 is a flowchart for detective monotonicity in accordance with the illustrative embodiments; and FIG. 11 is a flowchart for detective monotonicity in accordance with the illustrative embodiments.

DETAILED DESCRIPTION OF THE PREFERRED EMBODIMENT

Figure 1:
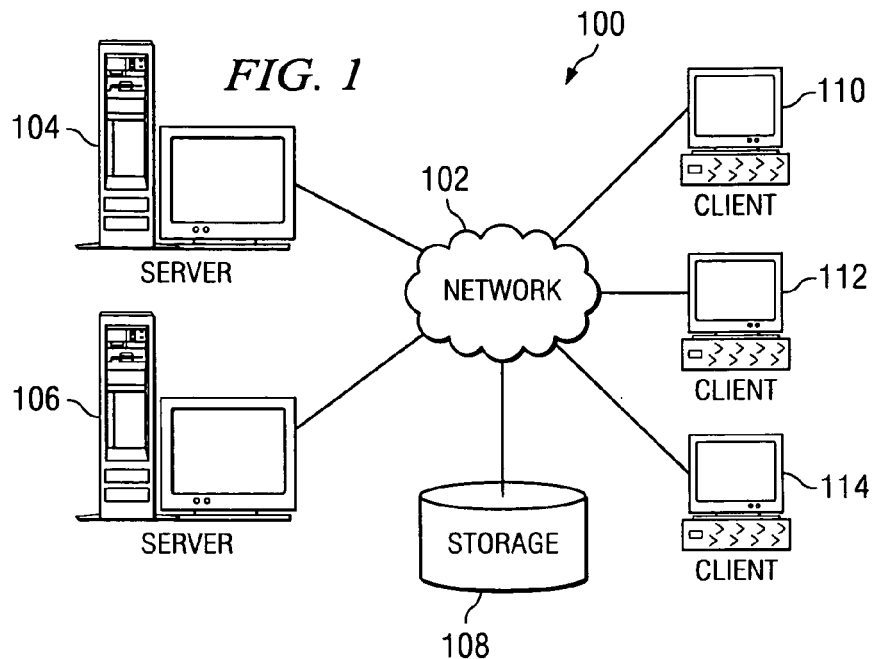
FIG. 1 is a pictorial representation of a data processing system in which the illustrative embodiments may be implemented.
Figure 2:
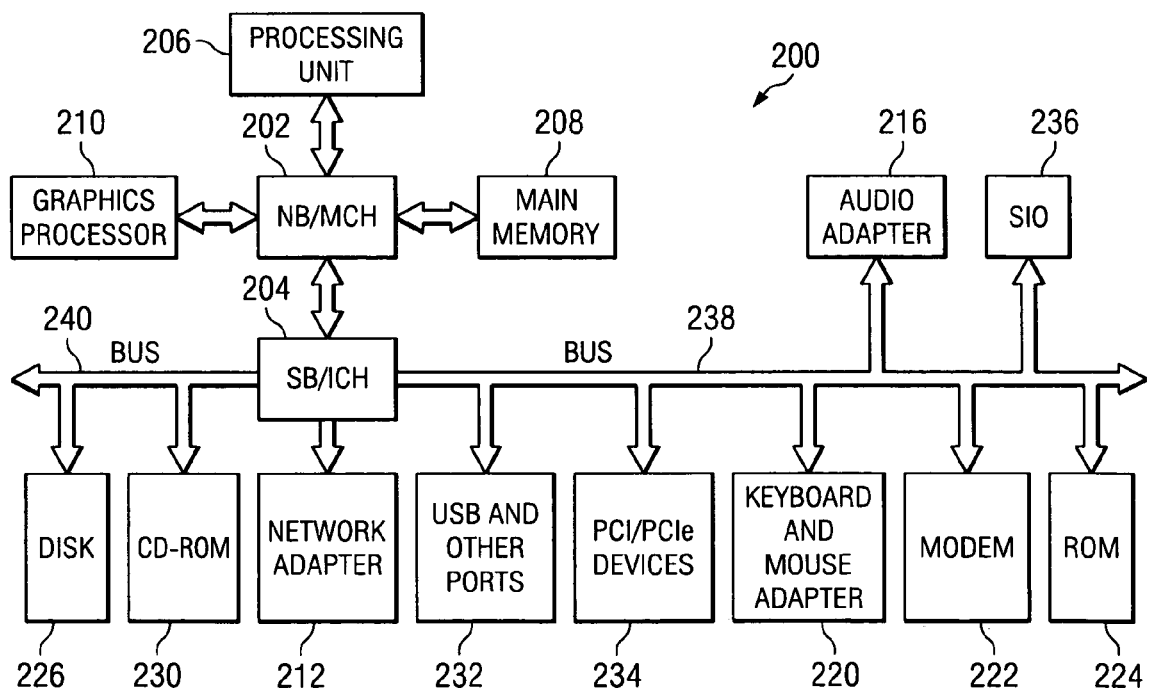
FIG. 2 is a block diagram of a data processing system in which the illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments may be implemented. Data processing system 200 is an example of a computer, such as server 104 or client 110 in FIG. 1, in which computer usable code or instructions implementing the processes may be located for the illustrative embodiments.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as Microsoft® Windows® XP (Microsoft and Windows are trademarks of Microsoft Corporation in the United States, other countries, or both). An object oriented programming system, such as the Java™ programming system, may run in conjunction with the operating system and provides calls to the operating system from Java programs or applications executing on data processing system 200 (Java and all Java-based trademarks are trademarks of Sun Microsystems, Inc. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

The illustrative embodiments provide a computer implemented method, apparatus, and computer usable program code for detecting and tracking monotonicity for accelerating range queries and inequality queries. The illustrative embodiments also provide a computer implemented method of detecting and recognizing any generated column function which is monotonic, as monotonic. A range condition for a query predicate is typically a condition which will result in more than one predicate value for that predicate qualifying. For example, the condition "where itemID between 2 and 4" will result in all values between the boundaries 2 and 4 qualifying. An inequality condition for a query predicate is typically a condition which will result in everything except one predicate value qualifying. For example, the condition "where itemID!=1" will result in all itemIDs which do not have a value of 1 qualifying.

The generated column function includes user-defined functions (UDF), SQL CASE statements, and built-in-functions. A user-defined function, in these examples, is a function that is defined in DB2® by using the CREATE FUNC- TION statement and that may be referenced thereafter in structured query languages (SQL) statements. DB2® is a family of relational database management system (RDBMS) products from IBM that serve a number of different operating system platforms. A user-defined function can be an external function or an SQL function.

In one illustrative embodiment referred to as detective monotonicity, functions are assumed to be monotonic until a record is inserted into the table which demonstrates that the function is not monotonic. In another illustrative embodiment referred to as declarative monotonicity, a user declares a function monotonic, and a database engine is charged with detecting any insert or update which would violate the monotonic declaration in order to disallow the insert.

Figure 3:
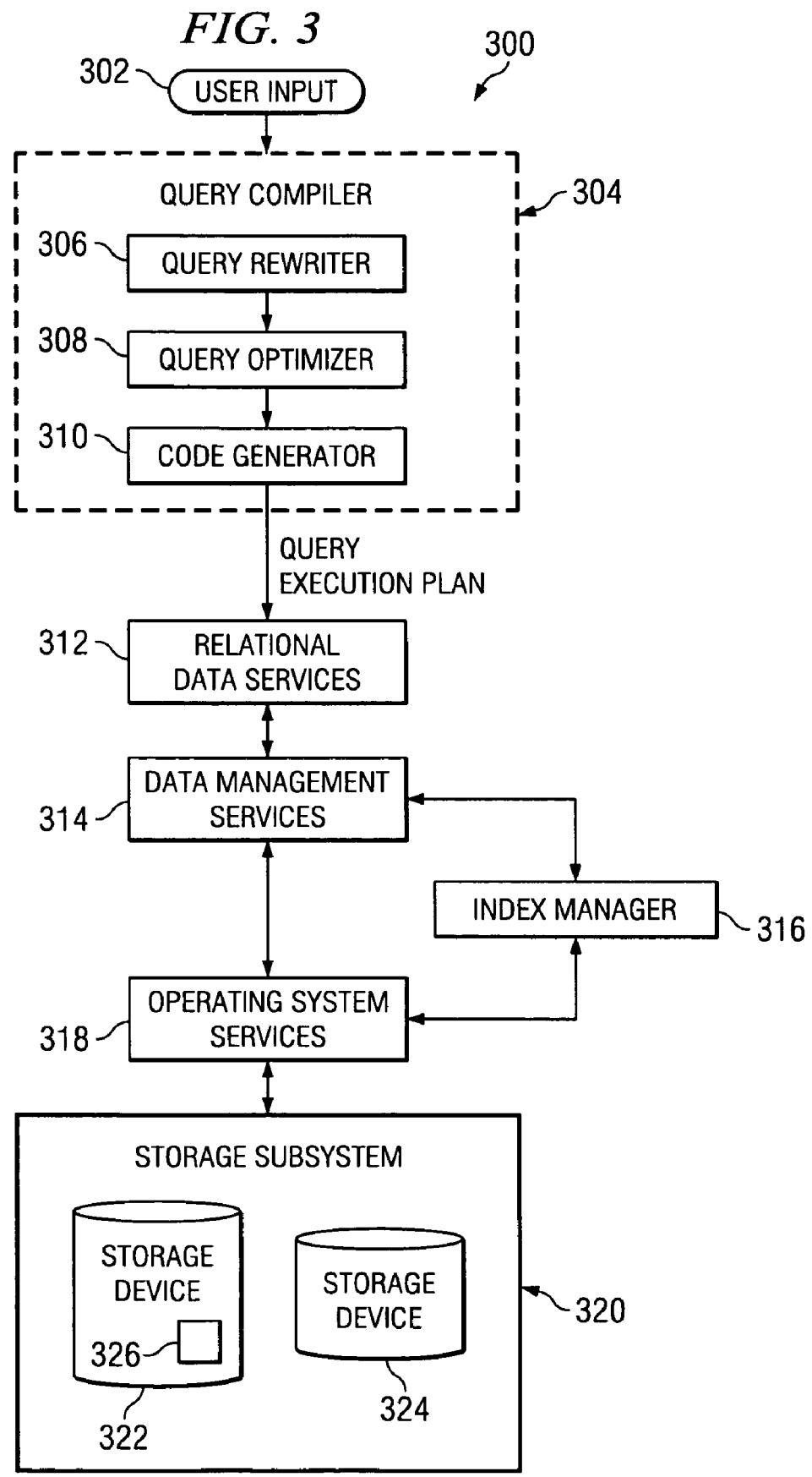
FIG. 3 is a block diagram of a database system in accordance with the illustrative embodiments.

FIG. 3 is a block diagram of a database system in accordance with the illustrative embodiments. Database system 300 is a computer program or suite of computer programs designed to manage a database and run operations on the data requested by numerous clients or users. Typical examples of database systems include accounting, human resources, and customer support systems.

Database system 300 may be implemented in a data processing system, such as data processing system 200 of FIG. 2. User input 302 is received for a user. For example, user input 302 may be a query request for a phone number. User input 302 is passed to query compiler 304. Query compiler 304 includes query rewriter 306, query optimizer 308, and code generator 310.

Query rewriter 306 is a function that takes a user-submitted query and rewrites the query into an equivalent query which will give the same result but will probably run more efficiently. Query rewriter 306 adds extra predicates if the generated function is monotonic. A predicate is a comparison operation that is used in a query. Specifically, a predicate is syntax that specifies a subset of rows to be returned. For example, predicates may be specified in the WHERE clause of a structured query language statement.

Query optimizer 308 is a component of the query compiler that costs and selects the best execution plan. Query optimizer 308 chooses an access plan for a data manipulation language statement by modeling the execution cost of many alternative access plans and choosing the one with the minimal estimated cost. Optimizers for extensible database systems are generally based on transformation rules for a set of operators defined in database system 300.

Code generator 310 generates the execution plan based on information from query optimizer 308. The query execution plan or a request to delete, insert, or update the execution plan is passed from code generator 310 to relational data services 312. Relational data services 312 execute the query execution plan. Relational data services 312 is charged with executing a query plan. The query plan may involve one or more tables. Relational data services 312 communicate with data management services 314. Data management services 314 is charged with single table operations that need to be performed in executing a query plan.

Data management services 314 communicate with index manager 316. Index manager 316 manages a number of indexes for one or more tables in the database. In particular, index manager 316 checks for monotonicity in detective monotonicity. Index manager 316 also enforces monotonicity for declarative monotonicity.

Operating system services 318 interacts with data management services 314 and index manager 316 to write and access data in storage subsystem 320. In one example, storage subsystem 320 includes storage devices 322 and 324 which may be hard drives, tape storages, or other common storage elements. Storage device 322 includes database 326.

Database 326 may be a relational database. A relational database is a database system in which the database is organized and accessed according to the relationships between data items without the need for any consideration of physical orientation and relationships. Relationships between data items in a relational database are expressed by means of a collection of tables logically associated to each other by shared attributes. Any data element may be found in a relationship by knowing the name of the table, the attribute (column) name, and the value of the primary key.

FIG. 4 is an exemplary table in accordance with the illustrative embodiments. In this example, table 400 is a table within a database, such as database 326 of FIG. 3. Table 400 is made up of records. A record is the storage representation of a single row of a table or other data. Frequently, a record is a group of related data, words, columns, or fields treated as a unit, such as name, address, and telephone number. In some cases, two or more columns may be interlinked with one column being generated from the other column. For example, year column 402 is called orderYear (OY) which is generated from date column 404 called orderDate. Date column 404 is the entire date, and year column 402 is generated to include only the year of date column 404. Year column 402 is a generated column because year column 402 was generated from data column 404.

To speed up query processing, users tend to create indexes. The indexes are frequently based on columns in which the queries have predicates or conditions. Indexes may be managed by a component, such as index manager 316 of FIG. 3. Table 400 includes item identification column 406, referred to as itemID, and nation column 408 and are used as further examples of columns. For example, an index on item identification column 406, referred to as itemId, may speed up a query, such as "select nation from table where itemId=1".

An index for year column 402 may be used to answer queries which have conditions on the base column, date column 404, because year column 402 is a generated column. For example, a query, such as "select nation from table where orderDate between 'Jan. 1, 1992' and 'Jan. 1, 1995'" may be answered by using the index of year column 402 (OY) if the query may be translated to the equivalent query "select nation from table where orderDate between '01/01/1992' and '01/01/1995' and OY between 1992 and 1995" or to "select nation from table where OY between 1992 and 1995".

The part of a database engine which performs automatic translation of queries without user interaction is a query rewriter, such as query rewriter 306 of FIG. 3. The ability to translate queries allows a system to use fewer indexes with improved query efficiency. The query rewriter may easily translate any query with an equality condition in it on the base column. However, if the query has a range condition or an inequality condition, then the query rewriter needs to know that the generated column is monotonic before the query rewriter may safely rewrite the queries. Monotonic functions preserve the given order in an increasing or decreasing order. Monotonic functions change in one direction only, either strictly rising or strictly falling but not reversing direction. A function F(n) is monotonic if x>y implies F(x)>=F(y) or if x>y then F(x)<=F(y). Examples of monotonic functions include Year(date). More explicitly, years are monotonic because they increment in an established order or pattern such as 2005, 2006, 2007, 2008, 2009 or 2009, 2008, 2007, 2006, 2005. For this example, if x=2005 and y=2006, F(x)>=F(y) is true.

In contrast, months are a non-monotonic function. Months may be numerically translated as follows: January—1, February—2, March—3, April—4, . . . November—11, and December—12, January—1, and so forth. If x=12 for December and y=1 for January then x>y. However, functionally January is before December and, as a result, $F(x)>=F(y)$ is not true or does not lead to a conclusive result. Other common examples of non-monotonic functions include circular measurements of degrees, tan(x), and hours of the day. As a result, using a non-monotonic function in an index may lead to incorrect results for some range and inequality queries.

Generated columns, such as year column 402 may be particularly useful for multi-dimensional clustered tables in DB2®. In such a DB2® system, the system clusters data on a generated column when requested with an index automatically created for the generated column. When queries come with conditions on the base column, the generated column may be used to answer equality queries in all cases. Additionally, if the function is detected as monotonic, then it may be used for range and inequality queries as well.

FIG. 5 is a function graph for monotonic and non-monotonic information in accordance with the illustrative embodiments. Function graph 500 is an illustrative graph further depicting the differences between monotonic and non-monotonic functions. Function f(x) 502 is an exemplary function which includes various records 504-514. Records 504-514, shown as points along function f(x) 502, represent records already present in function f(x) 502. Function f(x) 502 may be a generated column, such as year column 402 of FIG. 4. Function f(x) 502 may include an index for quickly accessing records 504-514.

As shown, function f(x) 502 is monotonic. If record O 516 is inserted, function f(x) 502 continues to be monotonic and is registered accordingly. However, if record X 518 is allowed to be inserted, function f(x) 502 will become non-monotonic. As a result, any query with a predicate on x but without a predicate on f(x) is disallowed from using the index on function f(x) 502.

FIG. 6 is a diagram for a data structure in accordance with the illustrative embodiments. Diagram 600 shows function f(x) 602 is a generated function, such as function f(x) 502 of FIG. 5 where x is a value such as date. The illustrative embodiments may be implemented by modifying the index on the generated column function f(x) 602 so as to additionally store the minimum and maximum value of all x currently in the table which results in the value function f(x) 602. Alternatively, for an index on x, each value of function f(x) 602 corresponding to each x is saved. Function f(x) 602 may be evaluated by an index manager, such as index manager 316 of FIG. 3.

For detective monotonicity, function f(x) 602 is assumed to be monotonic until proven otherwise. As shown in diagram 600, for record 604, incoming x values between 5 and 7, function f(x) 602 equal 6. For record 606, incoming values with x values between 9 and 10, function f(x) 602 equal 67. When new insert 608 in which x=8 and F(x)=12 is received, the index is updated, and a check is made to determine if new insert 608 is monotonic. The index manager determines if there are any earlier records, such as records 604 and 606 which have a similar f(x) value as the f(x) value of new insert 608. In some cases, multiple records may be compared against new insert 608 to verify monotonicity. Records 604 and 606 are used as upper and lower references because the f(x) value of new insert 608, 12, is between the f(x) value of record 604, 6, and f(x) value of record 606, 67.

In the example of new insert 608, there are no similar f(x) values. The index manager then checks to determine if the f(x) of new insert's 608 minimum x value is higher than the f(x) of record's 604 max x value and lower than the f(x) of record's 606 min x value. If the index manager determines the previous statement to be true, new insert 608 is detected to be monotonic even after the addition of new insert 608. In this example, x=8 of new insert 608 is between the max x=7 of record 604 and below the minimum x=9 of record 606.

If the index for function f(x) 602 had a previous f(x) of the same value and if new insert's 608 x falls beyond the max and min of the indexes f(x) specified by records 604 and 606 respectively, the new max or min is updated in the index to reflect the max/min x value of new insert 608. The check previously described is performed for subsequent new inserts.

If f(x) of new insert 608 did not exist on the index, a new index entry is created for new insert 608.

Subsequent to this check for detective monotonicity, all range and inequality queries on x will continue to be translated on f(x) until a new insert makes function f(x) 602 non-monotonic. At that point, all cache query plans will be invalidated and no subsequent translations will be done. The index for function f(x) 602 is no longer allowed to be used for queries with predicates on x and without predicates on f(x) 602 once function f(x) 602 becomes non-monotonic.

For declarative monotonicity, when an insert is going to be made in which the determination will make function f(x) 602 non-monotonic, that insert will be disallowed at insert time. The scheme outlined is especially suitable for multidimensional clustering (MDC) tables since multidimensional clustering tables clustered on a generated column would automatically have a block index on function f(x) 602.

In another illustrative embodiment, a special index is created on x with f(x) as an additional field. When new insert 608 is being processed, the index monitor checks that the f(x) of new insert 608 is between the upper and lower records f(x) values.

FIG. 7 is a flowchart for user actions in accordance with the illustrative embodiments. The process begins as the user creates a table and declares a generated column function as monotonic (step 702). The table and column of step 702 may be a table and column, such as table 400 and column 402 of FIG. 4. In step 702, the user may declare one or more functions as monotonic. Next, the user tries to perform an operation for a record into the table (step 704). The operation may be an insert, delete, update, or load operation for one or more records.

After step 702, the user subsequently submits a query on table with predicates on a base column of the generated column declared monotonic (step 706).

FIG. 8 is a flowchart for a declarative monotonicity process in accordance with the illustrative embodiments. The process of FIG. 8 may be performed by an index manager, such as index manager 316 of FIG. 3. The process of FIG. 8 for declarative monotonicity begins after step 704 of FIG. 7. The index manager determines whether the generated column would remain monotonic after the operation with this record (step 802).

If the index manager determines the generated column would remain monotonic, the index manager allows the operation (step 804) with the process terminating thereafter. If the index manager determines the generated column would become non-monotonic in step 802, the index manager refuses the operation (step 806) with the process terminating thereafter. The operation is refused in step 806 because the generated column was previously declared monotonic by the user in step 702 of FIG. 7 and allowing the operation would make the function non-monotonic.

FIG. 9 is a flowchart for a declarative monotonicity process in accordance with the illustrative embodiments. The process of FIG. 9 may be performed by a query rewriter, such as query rewriter 306 of FIG. 3. The process of FIG. 9 begins after step 706 of FIG. 7. The query rewriter uses the index on the generated column if costing allows rewriting the column with generated column predicates for this query (step 908) with the process terminating thereafter. The optimizer selects the plan with the lowest cost of operation from the various options available to the optimizer, such as query optimizer 308 of FIG. 3. One plan is based solely on the base predicates specified by the user as well as the rewritten query with additional generated column predicates. Additionally, other plan choices may also be available. The plan is picked based on the lowest estimated cost of operation.

FIG. 10 is a flowchart for detective monotonicity in accordance with the illustrative embodiments. The process of FIG. 10 may be performed by an index manager, such as index manager 316 of FIG. 3. For the process of FIG. 10, the generated column is assumed to be monotonic. The process of FIG. 10 for detective monotonicity begins after step 704 of FIG. 7.

The process begins with the index manager determining if the generated column would remain monotonic after the operation with this record (step 1002). If the index manager determines the generated column would remain monotonic, the index manager allows the operation (step 1004) with the process terminating thereafter. If the index manager determines the generated column would become non-monotonic in step 1002, the index manager allows the operation, marks the function as non-monotonic, and invalidates the cached query (step 1006) with the process terminating thereafter.

Concurrently, with the determination of step 1002, and after step 706 of FIG. 7, the query rewriter determines if the generated column would remain monotonic after the operation with this record (step 1008).

FIG. 11 is a flowchart for detective monotonicity in accordance with the illustrative embodiments. The process of FIG. 11 may be performed by a query rewriter, such as query rewriter 306 of FIG. 3. If the index manager determines the generated column would not remain monotonic in step 1008 of FIG. 10, the query rewriter maintains the original query predicate if query has range or inequality predicate conditions on base column. For queries with equality predicate conditions on base column, consider using the generated column if costing allows it (step 1110) with the process terminating thereafter. If the query rewriter determines the generated column would become monotonic after the operation with this record in step 1008 of FIG. 10, the query rewriter uses the index of the generated column if costing allows after rewriting the query with the generated column predicates (step 1112) with the process terminating thereafter.

Thus, the illustrative embodiments provide a computer implemented method, apparatus, and computer usable program code for detecting and tracking monotonicity for accelerating range and inequality queries. The illustrative embodiments allow functions to be detected or declared as monotonic for accelerating the efficiency of queries. Monotonicity may be detected for a generated column at run time. Operations are allowed or disallowed based on monotonicity for maintaining consistency and accelerating queries. Indexes are updated as needed based on determined monotonicity. As a result, the time required for responding to queries for generated columns with an associated index are greatly reduced.

The ability to translate queries allows a system to use fewer indexes with improved query efficiency.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for detecting monotonicity, the computer implemented method comprising:
   receiving an operation from a user wherein the operation is any of an insert operation, delete operation, update operation, and load operation:
   responsive to receiving the operation, determining whether function that is assumed to be monotonic will remain monotonic after performing the operation, wherein the function is part of a generated column that is generated from a base column;

responsive to determining that the function will remain monotonic after performing the operation, allowing the operation to be performed;

responsive to allowing the operation, updating a minimum values and a maximum values of the function and updating an index, wherein the index is the index on x values of the function with a function value as an additional field;

responsive to determining the function will become non-monotonic after the operation, allowing the operation, marking the function as non-monotonic, and invalidating a cached query plan;

receiving a query on the function from the user;

responsive to receiving the query, determining whether the function is monotonic and whether the function includes a range condition or an inequality condition;

responsive to determining that the function is monotonic and a determination that the function includes a range condition or an inequality condition, translating the query from a base column to a generated column using an index;

responsive to translating the query, using the index for answering the query;

responsive to determining that the function is non-monotonic and determining that the function includes the range condition or the inequality condition, maintaining an original query predicate of the query; and retrieving data specified in the query.

* * * * *